May 4, 1926.

E. S. ENSIGN 1,583,538

VALVE CAP FOR PNEUMATIC TIRES

Original Filed Sept. 18, 1922

Witness:
Ed. S. Borrow

Inventor:
Emory S. Ensign
By Wilkinson, Huxley, Byron & Knight
Attys

Patented May 4, 1926.

1,583,538

UNITED STATES PATENT OFFICE.

EMORY S. ENSIGN, OF ROCKFORD, ILLINOIS.

VALVE CAP FOR PNEUMATIC TIRES.

Application filed September 18, 1922, Serial No. 588,749. Renewed August 9, 1924.

*To all whom it may concern:*

Be it known that I, EMORY S. ENSIGN, a citizen of the United States, residing at Rockford, in the county of Winnebago and State of Illinois, have invented certain new and useful Improvements in Valve Caps for Pneumatic Tires, of which the following is a specification.

This invention relates to an improvement in the construction of caps which are applied to the inflating stems of pneumatic tires, and has for its object to provide a construction of cap which will effectively check the escape, between the cap and stem, of the air which leaks past the check valve normally used in inflating stems. Accordingly, the invention consists in providing the cap with a pressure chamber normally communicating with the bore of the stem and a washer having a form which permits it to seat against a wall of the stem and also against a wall of the cap which surrounds the stem, under the pressure of air accumulating in said chamber.

In the preferred embodiment, the washer is of annular form with a radial section approximately L-shaped to provide an expanding lip within the cylindrical wall of the cap, and is of a material, for instance, rubber, which not only permits it to conform readily to the face of the valve stem upon which it rests under the pressure of the accumulating chamber, but permits its annular lip to expand under such pressure into intimate contact with the surrounding wall of the cap; and a relatively light spring is employed for initially seating the washer against the stem.

In the accompanying drawing—

Figure 1:
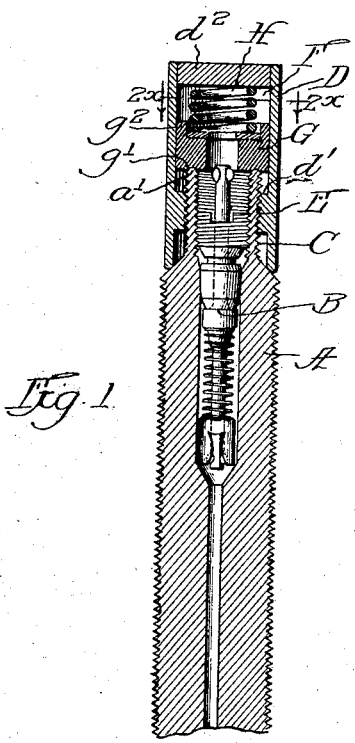
Figure 2:
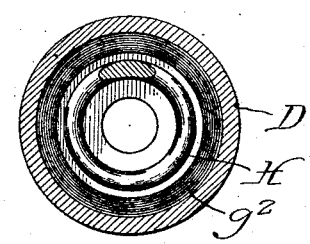

Figure 1 represents the preferred embodiment of the invention in axial section; and Figure 2 is a section on an enlarged scale taken on the line 2$^x$—2$^x$ of Figure 1.

A represents the valve stem through which to inflate a pneumatic tire or other air cushion, B represents the check valve thereof, and C the threaded end through which it receives the enclosing cap, all of which may correspond substantially to conventional practice. D represents the cap for closing the end of the stem A and which is applied thereto through the medium of screw threads E. Within the cap D is a chamber F which is normally in communication with the bore of the stem A, and within this chamber is arranged a packing washer G of such construction and arrangement that it serves the novel purpose of checking the escape of air between the cap D and the stem A. Preferably, the washer G comprises a transverse annulus $g'$ of dimensions which adapt it to overlie the end face $a'$ of the stem A, and with an axially extending cylindrical annulus $g^2$ conforming to the cylindrical inner wall of the cap D and acting as a sealing lip in connection therewith. A spring H interposed between the washer G and the end wall of the cap D normally seats the washer against the end wall of the stem.

In order to confine the washer G within the cap D and limit its displacement therein under the action of the spring F, said cap is preferably constructed with a shoulder $d'$ which receives the washer when the cap is removed, and if the washer is constructed of a material that can not be readily introduced through the resultant reduced bore of the cap, the end wall $d^2$ of the cap may be constructed separately therefrom and secured in place by soldering, brazing, or otherwise.

In use, when the cap D is screwed upon the stem A and air leaks from the inflated container past the normal check valve B, pressure will accumulate in the chamber F and develop a pressure of the washer G downwardly upon the end wall $a'$ of the stem and outwardly against the cylindrical inner wall of the cap with the result that the joint between the cap and the stem is effectively sealed against the escape of air, and any impairment of the permanent checking capacity of the valve B is rendered relatively unimportant.

I claim:

1. An inflating stem cap constructed with a chamber which communicates with the bore of the stem and which confines, under pressure, air escaping therefrom when the cap is in place thereon; a wall of said chamber consisting of a yielding washer forced into hermetic closure against the stem by the pressure of air in the chamber, and also hermetically sealed against escape of air between it and the other walls of said chamber.

2. An inflating stem cap constructed with a chamber which receives and confines under pressure, air escaping from a stem when the cap is in position thereon; a wall of said chamber comprising a yielding washer confined within the cap and having a bore through which the chamber communicates with the stem and said washer being by the pressure of air in the chamber, sealed hermetically against both the stem and the cap.

3. An inflating stem cap constructed with a chamber which receives and confines under pressure, air escaping from a stem when the cap is in position thereon; a wall of said chamber comprising a yielding washer surrounded by the inner wall of the cap and having a radially expansible bore through which the chamber communicates with the stem and said washer being by the pressure of air in the chamber sealed hermetically against both the stem and the surrounding wall of the cap.

4. A cap for inflating stems, constructed for attachment to a stem, having a pressure chamber normally in communication with the bore of the stem, equipped with a packing washer composed of a transverse annulus, seating, under the pressure of said chamber, against the end of the stem and of a cylindrical lip which expands, under such pressure, against the surrounding wall of the cap.

5. A cap for inflating stems of automobile tires, constructed for application to the end of the stem, and having a chamber adapted to confine, under pressure, air accumulating therein by leakage from the stem; said chamber having a port through one of its walls, through which it communicates with said bore but being otherwise hermetically sealed against the passage of air therefrom; the wall of said chamber through which said port is formed comprising a washer having one side exposed to pressure of air in said chamber and its other side yieldingly bearing against the end of the stem when the cap is in place; and said cap having an internal shoulder opposed to said other side of the washer from the pressure chamber.

6. A valve structure for pneumatic tires, comprising a stem provided with an air passageway, a removable cap on said stem adapted to contain air under pressure escaping from the stem, said cap encasing the upper portion of the stem, and means within said cap, operated by the internal air pressure in said cap, for sealing the joint between the cap and the stem.

7. A valve structure for pneumatic tires, comprising a stem provided with an air passageway, a removable cap on said stem that encases the upper portion of same, means operated by the internal pressure in said cap for sealing the joint between said cap and stem, and means for preventing the air from rushing out of the tire when the cap is removed from said stem.

8. A valve structure for pneumatic tires, comprising a stem provided with an air passageway, a removable cap that encases the upper portion of the stem, a flexible sealing device acted upon by the air that escapes through the air passageway in the stem for preventing air from escaping from the joint between the stem and cap, and means for retarding the escape of air from the tire through the passageway in said stem.

9. A valve structure for pneumatic tires, comprising a stem provided with an air passageway, a removable cap on said stem that encases the upper portion of same and having a portion that is separated from the stem by an annular space, a device for sealing said annular space that is maintained in operative condition by the internal pressure in the cap, and a valve for retarding the escape of air from the tire through the air passageway in the stem.

10. A valve structure for pneumatic tires, comprising a stem provided with an air passageway, a valve for retarding the escape of air from the tire through said passageway, a removable cap encasing the upper portion of said stem, and a sealing device in said cap provided with a flexible tubular portion that is held pressed tightly against the stem by the internal pressure in the cap.

11. A valve structure for pneumatic tires, comprising a stem provided with an air passageway, a valve for retarding the escape of air from the tire through said passageway, a removable cap on said stem that encases the upper portion of same, and a sealing device in said cap provided with two concentrically arranged, annular portions that are adapted to be held pressed tightly against the interior of the cap and the exterior of the stem by the internal pressure in the cap.

12. A valve structure for pneumatic tires, comprising a stem provided with an air passageway, a removable cap encasing the upper portion of said stem and provided with a gasket that bears against a shoulder on the stem, a flexible sealing device arranged between said gasket and the top of the cap and adapted to be maintained in operative condition by the internal pressure in the cap, and means that retards the escape of air from the tire through the passageway of said stem.

Signed at Rockford, Ill., this 14th day of September, 1922.

EMORY S. ENSIGN.